Feb. 23, 1926.
T. GREAVES ET AL
1,574,624
TIMBER DRAWING APPLIANCE
Filed Nov. 28, 1923    2 Sheets-Sheet 1
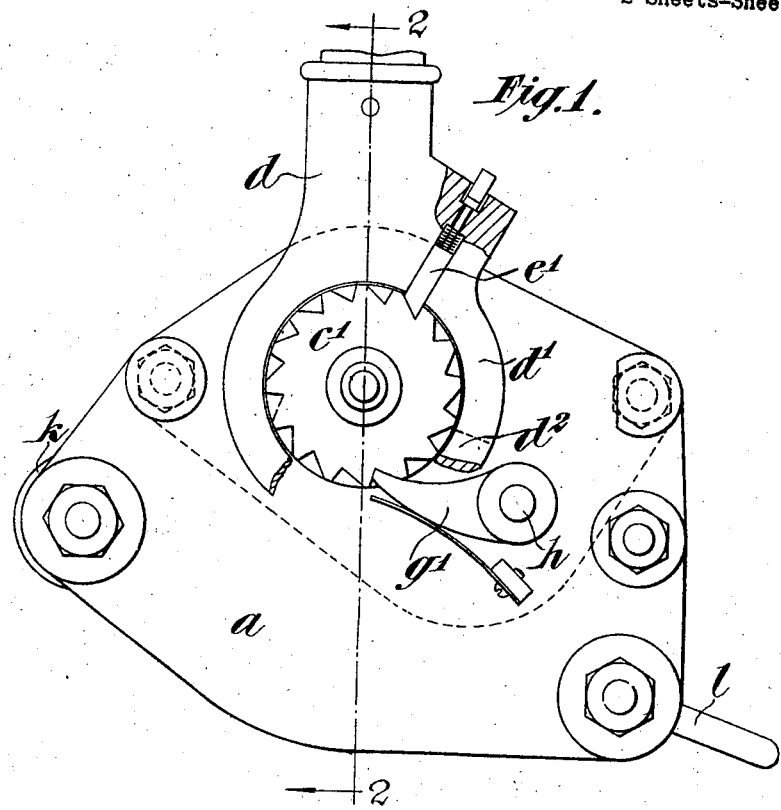
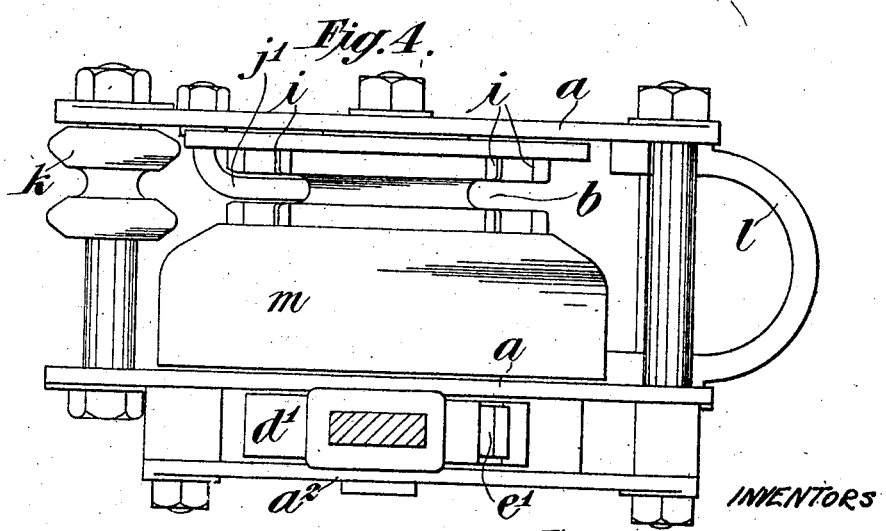
INVENTORS
Thomas Greaves
W. H. Darbourne
Vincent Warner
BY Feb. 23, 1926.  1,574,624
T. GREAVES ET AL
TIMBER DRAWING APPLIANCE
Filed Nov. 28, 1923   2 Sheets-Sheet 2
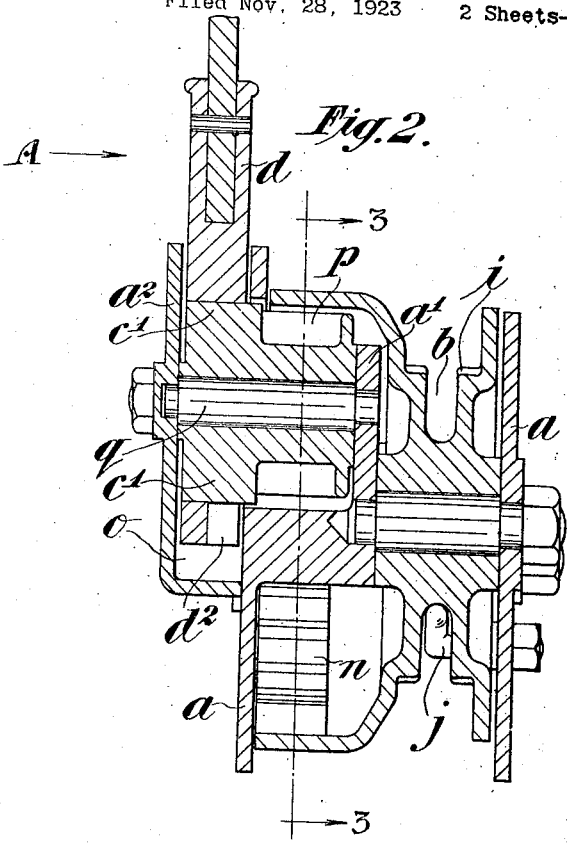
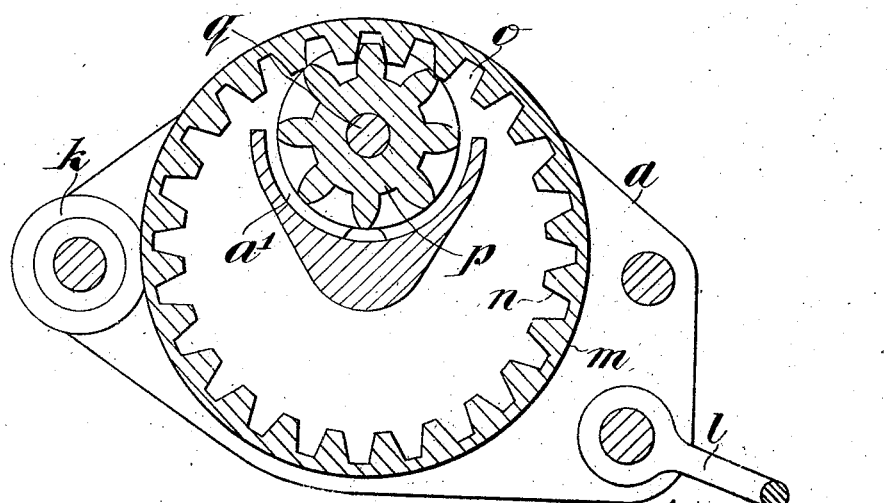
INVENTORS
Thomas Greaves
W. H. Darbourne
Vincent Warner Patented Feb. 23, 1926.

1,574,624

UNITED STATES PATENT OFFICE.

THOMAS GREAVES, WILLIAM HENRY BARBOURNE, AND VINCENT WARNER, OF MANSFIELD, ENGLAND, ASSIGNORS TO THE LITTLEJACK ENGINEERING CO. LIMITED, OF MANSFIELD, ENGLAND, A COMPANY REGISTERED UNDER THE LAWS OF GREAT BRITAIN.

TIMBER-DRAWING APPLIANCE.

Application filed November 28, 1923. Serial No. 677,475.

*To all whom it may concern:*

Be it known that we, THOMAS GREAVES, WILLIAM HENRY BARBOURNE, and VINCENT WARNER, all subjects of the King of Great Britain and Ireland, and residents of Mansfield, Nottinghamshire, England, have invented certain new and useful Improvements in Timber-Drawing Appliances (for which we have obtained a patent in Great Britain No. 195,823, dated 12th December, 1922), of which the following is a specification.

This invention relates to timber drawing appliances, and has for its object to provide an improved appliance to be used in the speedy and effective handling of timber pit-props in mines and the like places. It relates to the known type of apparatus worked on the ratchet and free-wheel principle, wherein there is employed a drum constructed to positively engage a chain in non-slipping manner, and controlled in its movements by a ratchet wheel capable of rotation step-by-step by means of the to-and-fro movement of a pivoted handle carrying a pawl, and is retained against backward movement by a stop pawl which is capable of being put out of operation at will to free the drum. In operation, such appliances are anchored to the ground or a convenient fixture by a shackle or the like, and the chain extending from the pit timber to be drawn passes around the drum and suitable guides, and a pull exerted by slowly winding by means of the ratchet handle, the appliance generally (according to the height of pull) assuming an inclined position away from the ground according to the general inclination of the chain.

The present invention consists of a geared machine of the foregoing type, that is to say, wherein the ratchet wheel does not drive the chain drum by a one-to-one movement but is constructed to drive a pinion meshing with a gear wheel fast with the chain drum.

In one form, the chain drum is formed with an internally toothed spur wheel inside which can rotate the pinion, the latter being fast with the ratchet wheel.

To render the invention clear, the latter embodiment will be described, and is illustrated by the accompanying drawings, wherein:—

Figure 1 is a side view, side plate removed, looking in direction of Arrow A (Figure 2);

Figure 2 is an end sectional elevation, on line 2—2 (Figure 1);

Figure 3 is a side elevation on line 3—3 (Figure 2); and,

Figure 4 is a plan view.

Referring to the drawings, instead of pivoting the handle $d$ about the shaft of the drum $b$, as is the usual practice, there is employed a countershaft $q$ carrying the handle pivot and ratchet separate from the drum $b$; the ratchet in the form illustrated is formed on one end of the barrel of a pinion which meshes with teeth on the drum $b$, by which compounded gear an easier leverage is obtained.

The drum $b$ is mounted between side plates $a$ and is formed with a hollow cylindrical extension $m$ interiorly toothed at $n$. One side plate $a$ has a portion $a^1$ inwardly offset and trough-shaped (see Figures 2 and 3), and an extra bearing plate $a^2$ is bolted to $a$ so that a pinion chamber $o$ is formed to house the pinion $p$ which is mounted on the shaft $q$ carrying the operating handle $d$. The pinion meshes with the teeth $n$ formed on the interior of the cylindrical extension $m$, and at the exterior of the pinion barrel ratchet teeth $c^1$ are formed which are engaged by pawl $e^1$ of the handle. A stop pawl $g^1$ is pivoted at $h$.

In operation, the step-to-step rotation of the ratchet and pinion barrel ($c^1$, $p$) is communicated to the chain drum $b$ through the gear $n$. It will be seen that the strap $d^1$ of the handle is recessed at $d^2$ to clear the pawl $g^1$; and to free the device so that chain can wind, or unwind, the actuating pawl $e^1$ is pulled up and, by half a turn, held up, and the handle pulled right back till the end wall of the recess $d^2$ engages and pushes away the stop pawl $g^1$. Chain can be paid out while the handle is so held down. To prevent inadvertent freeing of pawl $g^1$, a removable transverse pin or equivalent can be passed between the plates $a$ to limit the backward movement of the handle $d$. $j^1$ is a bent bar to prevent the chain wrapping around the underside of the drum $b$, which latter is suitably formed as at $i$ to make a chain grip. Suitable chain guides, such as rollers $k$, are provided, and $l$ is any suitable shackle eye.

We claim:—

1. A timber drawing appliance of the class described, comprising a pair of side plates, an inwardly directed supporting member upon the inner side of one of said plates, a bearing plate upon the outer side of said plate, a main shaft mounted in said supporting member and the other of said side plates, a counter-shaft mounted in said supporting member and said bearing plate, an anti-slip chain drum upon said main shaft, an interiorly toothed hollow cylindrical extension upon one side of said chain drum, a pinion barrel upon said countershaft provided with teeth for meshing with the teeth of said hollow extension, ratchet teeth upon one side of said pinion barrel, a spring-pressed stop pawl for engaging said ratchet teeth, an operating handle having a recessed strap surrounding said ratchet teeth, and an actuating pawl carried by said strap for engaging said ratchet teeth for rotating said pinion barrel and said chain drum for winding said chain.

2. A timber drawing appliance of the class described, comprising a pair of side plates, an inwardly directed supporting member upon the inner side of one of said plates, a bearing plate upon the outer side of said plate, a main shaft mounted in said supporting member and the other of said side plates, a counter-shaft mounted in said supporting member and said bearing plate, an anti-slip chain drum upon said main shaft, an interiorly toothed hollow cylindrical extension upon one side of said chain drum, a pinion barrel upon said countershaft provided with teeth for meshing with the teeth of said hollow extension, ratchet teeth upon one side of said pinion barrel, a spring-pressed stop pawl for engaging said ratchet teeth, an operating handle having a recessed strap surrounding said ratchet teeth, and an actuating pawl carried by said strap for engaging said ratchet teeth for rotating said pinion barrel and said chain drum for winding said chain, said actuating pawl being capable of being locked in withdrawn inoperative position, whereby upon further movement of said handle one end wall of the recess of said strap will contact with the locking pawl to cause the same to become disengaged from the ratchet teeth to permit the retrograde movement of said chain drum for paying out said chain.

3. A timber drawing appliance of the class described, comprising a pair of side plates, an inwardly directed supporting member upon the inner side of one of said plates, a bearing plate upon the outer side of said plate, a main shaft mounted in said supporting member and the other of said side plates, a counter-shaft mounted in said supporting member and said bearing plate, an anti-slip chain drum upon said main shaft, an interiorly toothed hollow cylindrical extension upon one side of said chain drum, a pinion barrel upon said counter-shaft provided with teeth for meshing with the teeth of said hollow extension, ratchet teeth upon one side of said pinion barrel, a spring-pressed stop pawl for engaging said ratchet teeth, an operating handle having a recessed strap surrounding said ratchet teeth, and a guard member upon said chain drum for preventing the overwinding and overlapping of the chain upon said drum.

In testimony whereof we have affixed our signatures hereto this 12th day of November, 1923.

THOMAS GREAVES.
WILLIAM HENRY DARBOURNE.
VINCENT WARNER.